P. MULOCK.
HOOK AND EYE FASTENER.
APPLICATION FILED JUNE 19, 1907.
944,101. Patented Dec. 21, 1909.
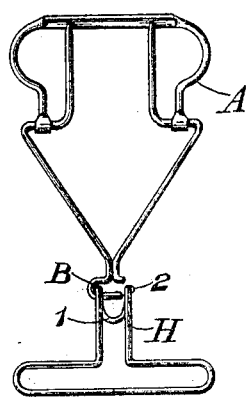
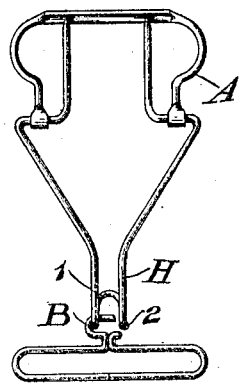
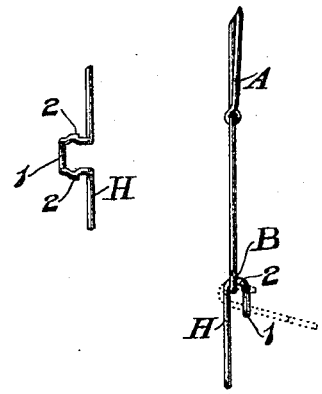
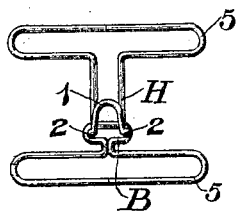
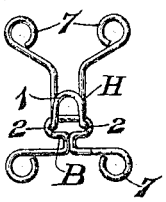
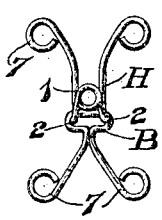
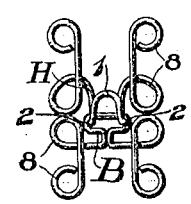
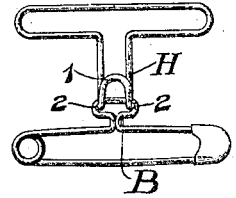
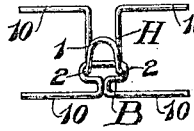
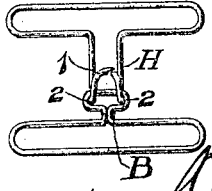

UNITED STATES PATENT OFFICE.

PETER MULOCK, OF LEADVILLE, COLORADO.

HOOK-AND-EYE FASTENER.

944,101. Specification of Letters Patent. Patented Dec. 21, 1909.

Application filed June 19, 1907. Serial No. 379,755.

*To all whom it may concern:*

Be it known that I, PETER MULOCK, a citizen of the United States, residing at Leadville, in the county of Lake and State of Colorado, have invented certain new and useful Improvements in Hook-and-Eye Fasteners, of which the following is a specification.

My invention relates to an improvement in hook and eye fasteners, and the object is to provide a device of the character named in which the fastening effected is simple, secure and quick-acting, requiring only one hand to operate it, and one which will preclude the possibility of accidentally unfastening.

With these objects in view, my invention consists in a hook having more or less abrupt enlargements or humps on its outer surfaces located on the bill side of the bend which forms the hook.

My invention further consists in a hook and eye, the hook portion of which is made of a single wire bent at or near the center to form the hook, which substantially fits the eye, the hook having oppositely and outwardly extending humps on its sides located in the bend of the hook and commencing approximately at the central axis of the hook or the portion of the hook adjacent to the main part and extending through the bill, whereby a space is left between the humps and body of the hook approximately corresponding to the elongations of the wire forming the eye.

My invention still further consists in a hook and eye, the eye of which is transversely elongated, and the hook of a width approximately fitting the eye widthwise, the hook having outwardly extending humps in the bend thereof, and on the bill side of the center of the bend of the hook, the hook through the humps being of greater width than the width of the eye, whereby when the hook and eye are engaged or disengaged, one or both yield to permit the humps to pass through the eye.

My invention still further consists in certain novel features of construction, and combinations of parts which will be hereinafter described and pointed out in the claims.

In the accompanying drawings:—Figure 1 is a view illustrating my improved hook and eye fastener in the form of a buckle and loop combined. Fig. 2 is a view of a similar device in which the hook and eye are transposed. Fig. 3 is an end view of the hook shown in Figs. 1 and 2. Fig. 4 is an edge view of the form of device shown in Fig. 1, dotted lines indicating the positions assumed when fastening and unfastening the parts. Fig. 5 is a view showing a double elongated loop construction. Figs. 6 and 7 illustrate a hook and eye in which eyelets are formed by which they may be sewed in or to the garment. Fig. 8 is a form of device especially adapted for plackets in which each member is provided with four eyelets. Fig. 9 illustrates a form in which the eye is connected with a safety pin. Fig. 10 illustrates a simplified form of eye. Fig. 11 illustrates another form of the invention.

In all the constructions illustrated, the essential features of the hook and eye are the same, the different views merely illustrating different exemplifications of my improved hook and eye.

My improved hook and eye may be made of wire, sheet metal or any other suitable material.

Referring to Fig. 1, A, represents a buckle, and B is the eye formed at the end of the buckle shank. This eye is preferably elongated laterally and relatively narrower.

H is a hook. This preferably consists of a single piece of material whether wire, or sheet metal, bent at or near the middle to form the hook bill 1, and the material forming the hook is offset or bent upwardly to form abrupt humps 2, 2, on the bill side of the hook so that sufficient space is left between the inner ends of the humps and the main shank of the hook to receive the eye so that the eye and hook practically lie in the same plane. By reason of the location described, the hook and eye normally extend in alinement with each other, as the space between the humps and the back of the hook constitutes a recess or seat for the eye, where the eye rests freely under normal conditions without pinching or compressing the hook, or the hook expanding or forcing the eye.

In operating the device, the hook is inserted in the eye, and then the eye is simply forced or snapped over the humps, either the hook or eye, or both of them yielding slightly as they are made of spring metal, and the outer end of the eye finds a fulcrum on one or the other of the inner surfaces of the hook. This operation is so simple that it can be accomplished by a single hand by simply forcing the parts out of alinement when hooked, and when unhooked by forcing them into alinement, or approximately into alinement.

The relative dimensions of the hook and eye are such transversely that the hook will not turn endwise in the eye, although it does and must turn lengthwise through the eye in the operation of hooking and unhooking.

In Fig. 2, the hook and eye are simply transposed, the hook being formed on the shank of the buckle, and the eye on the elongated loop.

In Fig. 5, a form of device is shown in which in lieu of the buckle, there are two elongated loops 5, 5, one in connection with the eye, and the other in connection with the hook.

In Figs. 6 and 7, the ends of the wire forming the hook and eye are bent into eyelets 7, 7, in one form being bent in one direction, and in the other in the opposite direction, these eyelets being provided as a means to facilitate sewing the fastener to garments.

In the form shown in Fig. 8, the wire is bent to form four eyelets 8, 8, this form of device being particularly adapted to plackets and other places where it is desired to bring parts close together, after sewing the fastening means.

In Fig. 9 the eye is connected with a safety pin 9, and in Fig. 10 in lieu of the elongated loop, the bars 10, 10, are provided.

In Fig. 11, an open hook is illustrated, or in other words, the ends of the wire come together in the bill of the hook instead of in the center of the elongated loop, but in other respects the hook is the same as those previously described, having the double hump located on the bill side of the hook.

In all the constructions, and as illustrated in Fig. 3, it will be observed that the humps 2, 2, are in the general form of a ratchet-tooth, the abrupt edge being on the inside, the object of which is to facilitate fastening, and render the unfastening of the hook and eye relatively difficult so that any danger of accidental unfastening is precluded.

The several forms of the device in which the elongated loop or bar is shown, are particularly adapted for fastening into trousers, overalls, and the like, and in other places where there is a good deal of strain, and the end of the double loops by coming together and abutting, afford a means of bracing the loop, thus formed.

It will be noticed that in the form of loop shown it is possible to stitch around the shank of the eye, that is between the eye proper and the bar or loop, thus securing the eye firmly in the fabric, this being especially true in the forms of device shown in Figs. 6, 7 and 8.

Thus, I provide a very simple hook and eye, which in addition to being simple is very inexpensive to manufacture as it requires a minimum amount of wire or other material in its construction. At the same time it is easily and quickly applied, it affords facility in hooking and unhooking, and otherwise in its manipulation, besides being strong and durable and effectual in the performance of all of its functions.

It is evident that additional slight changes might be made in the form and arrangement of the several parts described without departing from the spirit and scope of my invention, and hence I do not wish to limit myself to the constructions herein set forth, but:—

Having fully described my invention, what I claim as new and desire to secure by Letters Patent, is:—

1. As an article of manufacture, a hook and eye fastening, the hook portion of which is composed of a single piece of material bent to form a resilient compressible bill, the bill end of the hook being provided with a double hump at the bend where it joins the main portion of the hook.

2. The combination with a resilient compressible hook having the usual bill, the outer side of the bill having abrupt outwardly extending humps located a distance away from the back of the hook corresponding to the width of the material of which the hook is composed, of an eye adapted to receive said hook.

3. The combination with a resilient compressible hook having the usual bill, the outer side of the bill having abrupt outwardly extending humps located a distance away from the back of the hook corresponding to the width of the material of which the hook is composed, of an eye adapted to receive said hook, said eye being of a length slightly less than the width through the hump of the hook, and of a width less than the width of any portion of the hook whereby the hook is precluded from turning widthwise in the eye.

4. A hook and eye fastener consisting of a spring metal eye and hook, the hook compressible and having the usual bill and provided on the outer surface of its bend with humps, said humps being located on the bill side of the bend whereby a seat or recess is formed between the humps and back of the hook corresponding in width to the thickness of the material composing the eye.

In testimony whereof I affix my signature in presence of two witnesses.

PETER MULOCK.

Witnesses:
SIMON C. HODGES,
HERBERT C. EMERY.